United States Patent [19]

Gulau et al.

[11] Patent Number: 5,584,052

[45] Date of Patent: *Dec. 10, 1996

[54] INTEGRATED MICROPHONE/PUSHBUTTON HOUSING FOR VOICE ACTIVATED CELLULAR PHONE

[75] Inventors: David B. Gulau, Livonia; Jeffrey P. Huget, Westland; Robert L. Varilone, Farmington Hills; Mark D. Edwards, Canton, all of Mich.

[73] Assignee: Ford Motor Company, Dearborn, Mich.

[ * ] Notice: The portion of the term of this patent subsequent to Sep. 12, 2012, has been disclaimed.

[21] Appl. No.: 375,194

[22] Filed: Jan. 18, 1995

Related U.S. Application Data

[63] Continuation of Ser. No. 976,743, Nov. 16, 1992, abandoned.

[51] Int. Cl.$^6$ .................................................. H04B 1/46
[52] U.S. Cl. ........................... 455/79; 455/90; 455/99; 455/297; 455/345; 395/2.84; 395/2.4
[58] Field of Search ............................ 455/79, 74, 116, 455/344, 345, 346, 347, 349, 89, 90, 351, 297, 99, 33.1; 379/58, 59, 420, 389, 421; 381/41, 42, 43, 44, 45; 395/2.84, 2.79, 2.6

[56] References Cited

U.S. PATENT DOCUMENTS

| 4,151,468 | 4/1979 | Kerr | 455/345 |
|---|---|---|---|
| 4,401,852 | 8/1983 | Noso et al. | 381/43 |
| 4,426,733 | 1/1984 | Brenig | 455/79 |
| 4,532,648 | 7/1985 | Noso et al. | 381/41 |
| 4,558,459 | 12/1985 | Noso et al. | 381/43 |
| 4,797,924 | 1/1989 | Schnars et al. | 381/43 |
| 4,896,360 | 1/1990 | Knight | 381/82 |
| 4,993,674 | 2/1991 | Van Hout et al. | 248/229 |
| 5,008,954 | 4/1991 | Oppendahl | 455/79 |
| 5,081,707 | 1/1992 | Schorman et al. | 455/345 |
| 5,230,089 | 7/1993 | Kindinger et al. | 455/79 |
| 5,247,705 | 9/1993 | Attig et al. | 455/79 |
| 5,263,181 | 11/1993 | Reed | 455/92 |
| 5,450,525 | 9/1995 | Russell et al. | 395/2.84 |

*Primary Examiner*—Reinhard J. Eisenzopf
*Assistant Examiner*—Nguyen Vo
*Attorney, Agent, or Firm*—Mark Mollon

[57] ABSTRACT

A voice controlled vehicle accessory system is responsive to voice commands and/or manual commands wherein the manual commands are entered via a single pushbutton 16 having multiple functions depending upon the instantaneous state of a system controller 10. A single housing houses the microphone for the voice recognition unit and the single pushbutton adjacent to each other in a common location in the vehicle, thereby reducing manufacturing costs and increasing user convenience since the two separate input functions are intuitively placed in a common location.

7 Claims, 1 Drawing Sheet

INTEGRATED MICROPHONE/PUSHBUTTON HOUSING FOR VOICE ACTIVATED CELLULAR PHONE

This is a continuation of application Ser. No. 07/976,743 filed Nov. 16, 1992, now abandoned.

BACKGROUND OF THE INVENTION

The present invention relates in general to the control of a voice activated cellular phone and, more specifically, to providing a common housing for a manual pushbutton control and a voice input microphone.

Voice recognition has been and continues to be developed to provide input to electronically controlled systems in response to spoken commands. Voice responsive systems are useful in automotive vehicles to control vehicle accessories with minimal effort, minimal errors, and maximum convenience. As used herein, vehicle accessory means any system controlled by an occupant of a vehicle such as a cellular phone, an audio entertainment system, a climate control system, a vehicle lighting system, a windshield wiper system, a window defrost system, or a vehicle speed control system, for example.

A voice recognition unit receives a speech input by way of a microphone in the form of an utterance which is compared to preprogrammed and stored utterances to determine a match that identifies an appropriate command. The reliability of matching an utterance with the intended command is related to ambient background noise contained in an utterance picked up by the microphone and to the size of a corresponding command set with which an utterance is to be compared. In a typical voice recognition unit, the degree of similarity between a received utterance and the preprogrammed utterances is designed to provide optimum voice recognition performance without errors. However, it is known to require an even closer match in certain comparisons to avoid a problem known as "falsing", which is unintended actuation of a command such as the powering on of a system leading to annoying or incorrect operation.

On the other hand, when such a closer match is required it may become difficult to activate a desired command in a noisy environment—especially for an utterer other than the one who trained the recognition unit. Furthermore, voice characteristics or habits of a particular user may be somewhat inconsistent, thereby making voice control difficult.

Co-pending application Ser. No. 07/975,047 solves these problems by providing a single button means for generating a button signal in response to a manual activation. The button signal initiates multiple control functions depending upon the respective state of the controller. One function of the button signal may be to bypass the spoken command requiring a closer match.

The present invention has the advantages of increased system integration, reduced manufacturing costs, and improved ergonomic performance for a user.

SUMMARY OF THE INVENTION

A cellular telephone system for a vehicle is responsive to voice and manual commands and comprises a cellular transceiver, single button means, a microphone, voice recognition means, controller means, and housing means. The single button means generates a button signal in response to a manual activation. The voice recognition means is coupled to the microphone for recognizing predetermined commands spoken into the microphone and for generating a respective voice command signal. The controller means is coupled to the voice recognition means, the single button means, and the cellular transceiver for controlling the cellular transceiver in response to the button signal and the voice command signal. A respective one of a plurality of functions is performed by the controller means in response to the button signal depending upon a respective state of the controller means when the button signal is sensed. The housing means houses the microphone and the single button means adjacent each other in a common location in the vehicle. By placing the microphone and the single button means in a common location, a user intuitively associates both spoken and manual inputs with a single location, thereby providing convenient system operation.

DETAILED DESCRIPTION OF PREFERRED EMBODIMENTS

Figure 1:
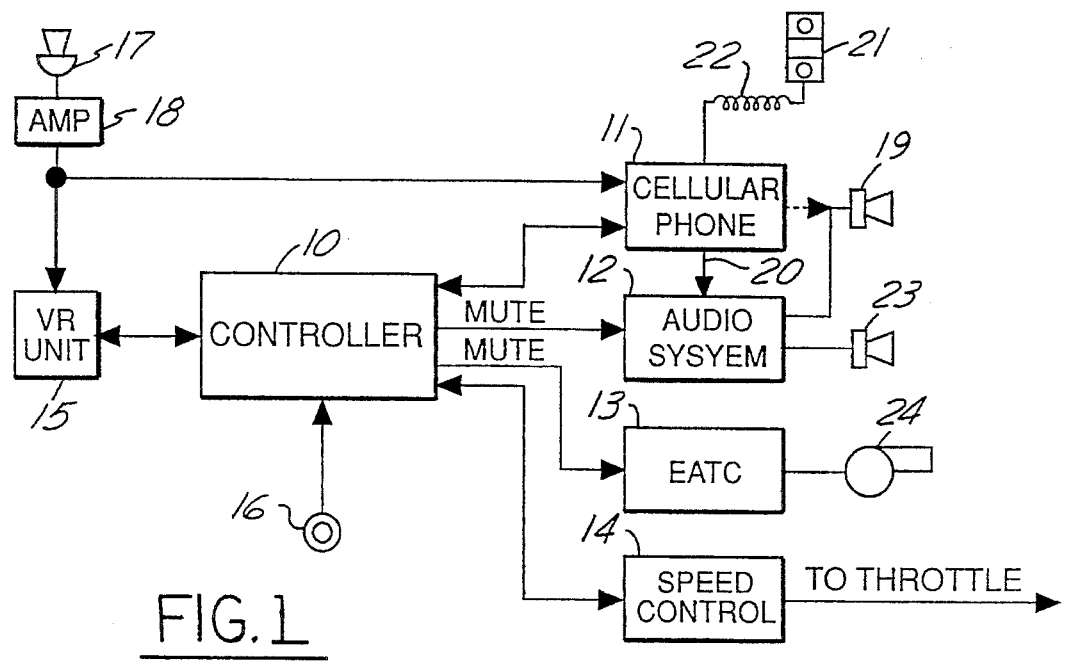
FIG. 1 is a block diagram of a voice activated cellular telephone system.

Referring to FIG. 1, a specific embodiment of the present invention is shown including a controller 10 for controlling a cellular phone transceiver 11. Other accessories may also be responsive to the controller such as an audio system 12, an electronic automatic temperature control (EATC) 13, and a speed control 14. Controller 10 is connected to a voice recognition (VR) unit 15 and a single normally-open pushbutton 16. VR unit 15 receives voice signals from a microphone 17 amplified by a preamplifier 18. To reduce system components, microphone 17 is also connected to cellular phone 11 as a hands-free microphone for use during phone conversation. A hands-free cellular speaker 19 is also connected to cellular phone 11. Audio system 12 includes a dedicated speaker 23. To further improve system integration, speaker 19 is shared by cellular phone 11 and audio system 12. Hands-free speaker signals from cellular phone 11 are routed to audio system 12 via interconnection 20. EATC 13 is connected to a fan motor 24 and is responsive to controller 10 to reduce the fan speed during cellular phone use and/or to adjust fan speed in accordance with voice or pushbutton commands. In response to manual activation of the pushbutton, controller 10 may provide mute signals to audio system 12 and EATC 13 to reduce noise in the vehicle during attempted recognition by VR unit 15, thereby improving the likelihood of correct recognition of voice commands.

Cellular telephone 11 is connected to a handset 21 via a cord 22 and to an antenna(not shown). When cellular phone 11 detects an incoming call, it signals controller 10 so that all parts of the system can be placed in their proper operating mode to receive a call. Thus, controller 10 is responsive to an accessory signal from cellular phone 11 identifying the incoming call.

Controller 10 may control a plurality of accessories, as shown by an additional connection to speed control 14 which is further connected to a throttle (not shown). When controlling a plurality of vehicle accessories, controller 10 may affect either total or partial control of each respective accessory. In one preferred embodiment, controller 10 has total control of cellular telephone and partial control of audio system 12 and EATC 13, i.e., EATC 13 can only be muted by controller 10.

Figure 2:
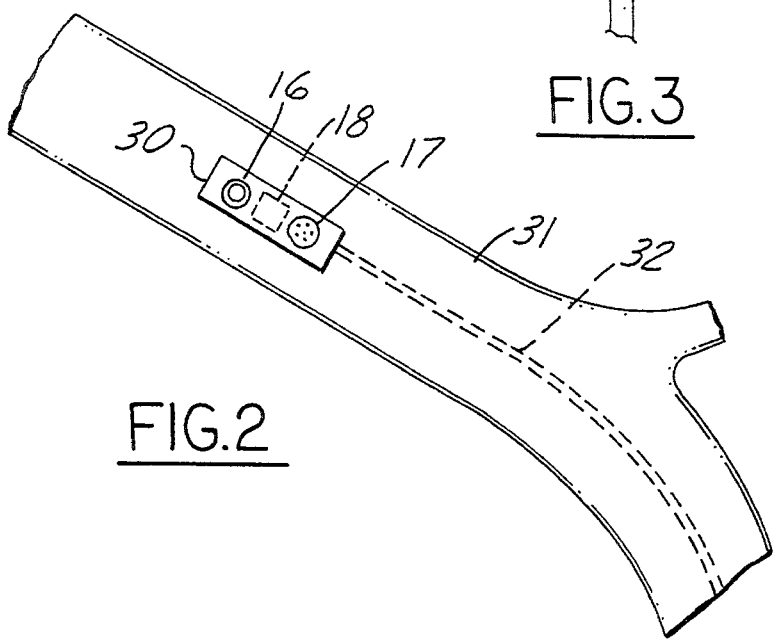
FIG. 2 is a front view showing the housing of the present invention incorporated in the "A" pillar of a vehicle.

Referring to FIG. 2, an integrated microphone/pushbutton housing 30 is mounted in an A-pillar 31 which supports a vehicle roof between a front windshield and a vehicle door. Housing 30 has pushbutton 16, microphone 17 and amplifier 18 mounted therein. Preferably housing 30 is mounted in the driver side A-pillar because the primary user of the cellular telephone is typically the driver. A wire bundle 32 contains interconnecting wires for pushbutton 16 and amplifier 18 and passes through the A-pillar and through the vehicle to the location of the controller (typically included in a housing for the cellular transceiver in the passenger compartment or in the trunk).

Figures 3, 4:
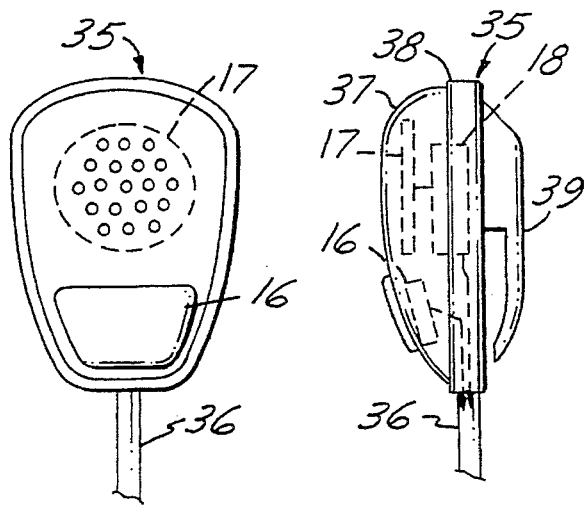
FIG. 3 is a front view showing a clip-on housing used in an alternative embodiment of the invention.
FIG. 4 is a side view of the housing of FIG. 3.

FIG. 3 shows an alternate embodiment wherein a relocatable shell 35 provides a housing for pushbutton 16, microphone 17, and amplifier 18. Shell 35 is connected to a flexible cable 36 including wire conductors and which is further connected to the cellular phone controller. Thus, the microphone and single pushbutton may be relocated within the vehicle to a desired location. As shown in the side view of FIG. 4, shell 35 includes an upper portion 37 and a lower portion 38. A clip 39 is attached to the rear surface of shell 35 for clipping the shell at a desired location, such as on the headliner surrounding the windshield of a vehicle or elsewhere. Other attachment means may also be employed, such as a hook and loop fastener.

What is claimed is:

1. A cellular telephone system for a vehicle responsive to voice and manual commands, comprising:

a cellular transceiver;

single button means for generating a button signal in response to a manual activation;

a hands-free microphone coupled to said cellular transceiver for use during phone conversation;

voice recognition means coupled to said hands-free microphone for recognizing predetermined commands spoken into said hands-free microphone and generating a respective voice command signal;

controller means coupled to said voice recognition means, said single button means, and said cellular transceiver for controlling said cellular transceiver in response to said button signal and said voice command signal, wherein a respective one of a plurality of functions is performed by said controller means in response to said button signal depending on a respective state of said controller means when said button signal is sensed; and housing means for housing said hands-free microphone and said single button means adjacent each other in a common location in said vehicle separate from the location of said voice recognition means, said controller means and said cellular transceiver.

2. The system of claim 1 wherein said housing means is comprised of a shell and wherein said system further includes a flexible cable coupling said shell with said transceiver.

3. The system of claim 2 wherein said housing means is further comprised of clip means for clipping said shell in selected locations within said vehicle.

4. The system of claim 1 wherein said vehicle includes an A-pillar for supporting a vehicle roof at the forward end of a vehicle cabin and wherein said housing means is retained in said A-pillar.

5. The system of claim 4 wherein said A-pillar is located on the driver's side of said vehicle.

6. The system of claim 1 wherein said single button means is comprised of a normally-open pushbutton.

7. The system of claim 1 further comprising amplifier means retained in said housing means and coupled to said microphone for amplifying signals generated by said microphone and providing amplified signals to said transceiver.

\* \* \* \* \*